United States Patent [19]

Takahashi

[11] Patent Number: 4,842,784

[45] Date of Patent: Jun. 27, 1989

[54] METHOD OF MANUFACTURING A CLIMBING STEP WITH EMBEDDED REFLECTION PLATE

[75] Inventor: Eizo Takahashi, Soka, Japan

[73] Assignee: Miyama Kogyo Kabushiki Kaisha, Saitama, Japan

[21] Appl. No.: 224,314

[22] Filed: Jul. 26, 1988

Related U.S. Application Data

[62] Division of Ser. No. 76,071, Jul. 21, 1987, Pat. No. 4,778,032.

[30] Foreign Application Priority Data

Jul. 30, 1986 [JP] Japan ................................ 61-116926

[51] Int. Cl.[4] ....................... B29C 41/20; B29C 45/16; B29C 65/02

[52] U.S. Cl. ..................................... 264/1.9; 264/266; 264/277; 425/129.1

[58] Field of Search ................ 264/261, 266, 279, 1.9, 264/277; 425/129.1

[56] References Cited

U.S. PATENT DOCUMENTS

| | | | |
|---|---|---|---|
| 2,064,803 | 12/1936 | Grove | 72/100 |
| 2,179,412 | 11/1939 | Keuthon | 182/90 |
| 3,097,060 | 7/1963 | Sullivan | 264/261 |
| 3,253,971 | 5/1966 | Garling | 350/109 |
| 3,445,559 | 5/1969 | Siteman | 264/266 |
| 3,608,049 | 9/1971 | Tavella | 264/266 |
| 3,830,682 | 8/1974 | Rowland | 350/109 |
| 4,058,942 | 11/1977 | Naka | 52/181 |
| 4,289,819 | 9/1981 | Kalman | 52/177 |

FOREIGN PATENT DOCUMENTS

| | | |
|---|---|---|
| 54-82838 | 7/1979 | Japan . |
| 60-66746 | 5/1985 | Japan . |

*Primary Examiner*—Jan H. Silbaugh
*Assistant Examiner*—Kelley M. Sidwell
*Attorney, Agent, or Firm*—Oliff & Berridge

[57] ABSTRACT

A climbing step and its manufacturing method. The climbing step which is installed on wall surfaces of a manhole, pier or the like for ascent and descent is arranged such that a part of the step is coated with a layer of synthetic resin, and a reflection plate including protruding portions for preventing slippage are formed in the synthetic resinous surface. The reflection plate is embedded in the resinous surface over the tread portion while causing the surface to be exposed.

2 Claims, 5 Drawing Sheets

METHOD OF MANUFACTURING A CLIMBING STEP WITH EMBEDDED REFLECTION PLATE

This is a division of application Ser. No. 076,071 filed July 21, 1987, now U.S. Pat. No. 4,778,032.

BACKGROUND OF THE INVENTION

At an initial stage of this field, a climbing step constituted by a substantially U-shaped or bent metalic bar was used in such a manner that its free ends are embedded into concrete. In the great majority of cases, however, the step member is exposed to the wind, rains or toxic gases, whereby the step member undergoes corrosion. For the purpose of preventing this kind of corrosion, there has been proposed a U-shaped step which is disclosed in the specification of U.S. Pat. No. 2,064,803, the arrangement being such that its portion exposed from the concrete is coated with synthetic resin.

The device of U.S. Pat. No. 2,064,803 certainly exhibited effectiveness against the corrosion. However, where a plurality of climbing steps are installed on the wall surface of, for instance, a manhole by embedding their proximal portions therein, a person ascending or descending the steps must search for the tread portion of the individual steps with his feet, because such steps are difficult to recognize by eyesight especially when used in poorly lighted areas.

On the other hand, the specification of Japanese Utility Model Laid-Open No. 66746/1985 discloses another type of step wherein a disc-like small reflection plate is embedded in a bend or angular portion formed at the boundary between an arm member and a tread portion of a U-shaped step coated with the synthetic resin. The reflection plate of this type involves a plastic transparent plate whose underside surface is formed with prism-like rugged portions. Problems inherent in this disc-like small reflection plate, however, arise because the plate is difficult to see on account of its smallness, and the plate is apt to separate from the plastic coating member.

In the specification of Japanese Patent Laid-Open No. 82838/1979, there is disclosed a climbing step having such a structure in which 'retroreflection tapes' are bonded with the aid of a bonding agent to grooves formed in the upper surface of the step. The 'retroreflective tape' is thin, and adhesion thereof entirely depends on the bonding agent which is previously applied to its hidden surface. Consequently, when employing this kind of tape for the climbing step, the tape is likely to be damaged or peeled off. In addition, the step portion to which the tape is bonded needs to be smooth. The tape is adhered after construction of the step and hence its manufacture undesirably requires one extra process.

SUMMARY OF THE INVENTION

It is a primary objectof the present invention to provide a climbing step comprising: a metal core member including a pair of legs having their end portions adapted to be embedded in the wall surface and a thread portion provided between the two legs; a layer of synthetic resin for coating at least the thread portion and a part of the legs; and a transparent plastic reflection plate having an undersurface formed with prism-like rugged portions which are embedded in the resin, the upper surface of the plate being exposed at least in the upper surface of the layer of synthetic resin which covers the thread portion, and the surface of the plastic reflection plate being provided with non-slip protrusions.

According to one aspect of the invention, there is provided a climbing step wherein the synthetic resin with which the thread portion is coated involves polypropylene or the like, and a material of the reflection plate involves polycarbonate or the like.

According to another aspect of the invention, there is provided a climbing step wherein, when manufacturing the climbing step, the reflection plate is disposed along the predetermined wall surface of a molding tool, and the synthetic resin is injected in the molding tool while supporting the thread portion of a step body on the central portion of the molding tool.

According to still another aspect of the invention, there is provided a climbing step wherein the reflection plate is bonded by use of a bonding agent to the thread portion of the metal core member which is coated with the previously molded layer of synthetic resin.

BRIEF DESCRIPTION OF THE DRAWING

The invention will be described in detail with reference to the appended drawings in which like reference numerals designate like elements, and wherein.

DETAILED DESCRIPTION OF THE PREFERRED EMBODIMENTS

One embodiment of the present invention will hereinafter be described with reference to FIGS. 1A, 1B and 2.

Figure 1A:
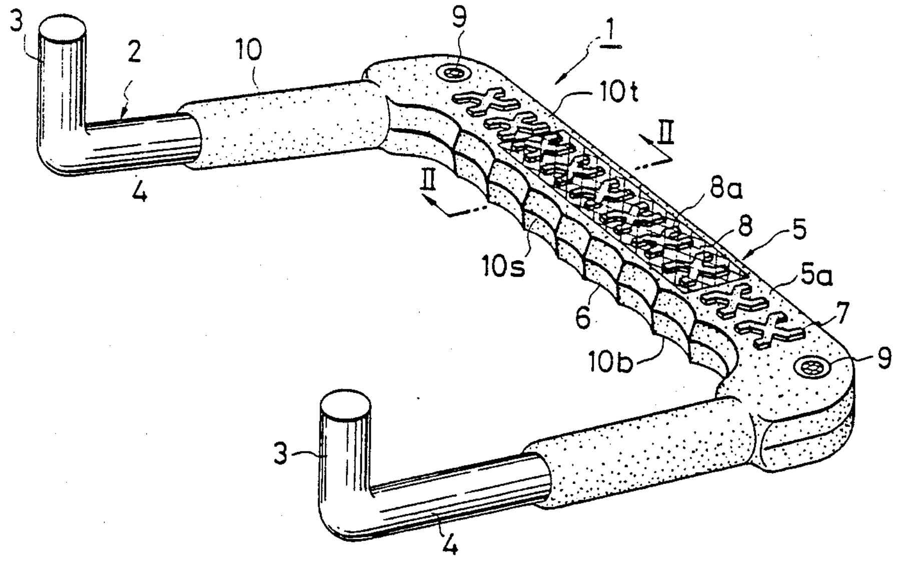
FIGS. 1A and 1B are perspective views of a climbing step according to the present invention.
Figure 1B:
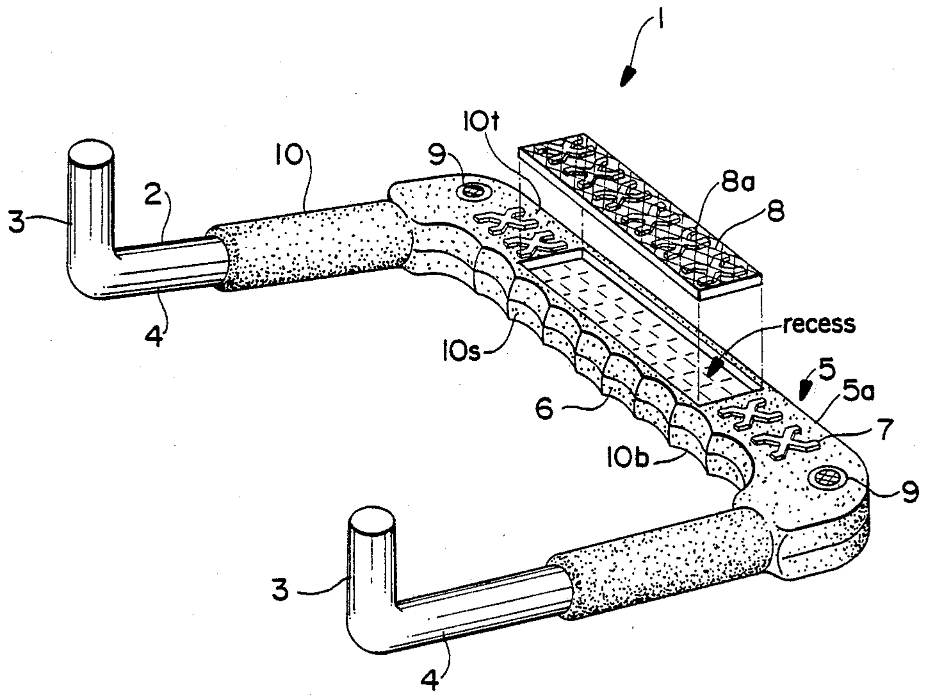

As illustrated in FIGS. 1A and 1B, a metal core member 2 having a tread member 1 as a step in formed in such a way that a round iron bar is bent in a substantial U-shape, and both end portions 3 thereof are also bent up in a direction perpendicular to the plane made by the U-shaped step. Such end portions 3 are embedded into an unillustrated side wall of a manhole to prevent it from being removed therefrom. A pair of legs 4 of the metal core member 2 are coated with a synthetic resinous layer 10 composed of polypropylene or the like, covering two-thirds of the overall length of each leg (one-third from each end portion 3 is left bare) and further an entire tread portion 5.

Figure 2:
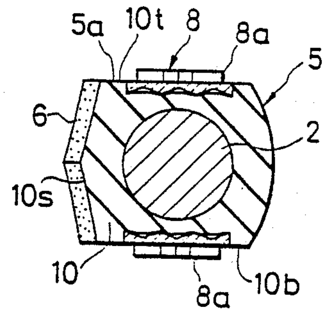
FIG. 2 is an enlarged sectional view taken substantially along the line II—II of FIG. 1.

The tread portion 5 coated with the synthetic resinous layer 10, as illustrated in FIG. 2, assumes a substantially rectangular configuration in cross-section to define a top surface 10*t* and a bottom surface 10*b*. However, a side surface 10*s* on the inside of the U-shaped portion has a series of wavelike projections 6 so that a hand does not deviate in the axial direction when seizing the tread portion with the hand. This provides the side surface 10s with a rugged surface when grasped.

A plurality of substantially X-shaped non-slip protrusions 7 are formed to protrude from a tread surface 5a which is formed flat on each of the upper and lower surfaces of the tread portion 5. The illustrated configuraiton of the protrusion 7 is not particulalry limited and other configurations and designs are possible.

Figure 3:
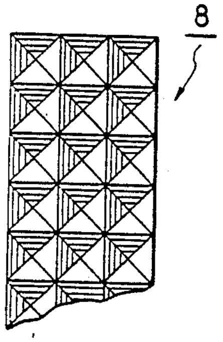
FIG. 3 is a view showing an underside surface of a transparent plastic reflection plate, the underside surface being formed with prism-like rugged portions utilized for the present invention.

To the center of the tread surfaces 5a are integrally attached rectangular reflection plates 8 with a length of approximately one-half of the overall length of the tread portion 5. The underside of each individual reflection plate 8 is, as illustrated in FIG.3, formed with prism-like recessed portions and embedded in a recess in the center of the tread portion 5 to form a flush surface with the tread surface 5and embedded in a recess in the center of the treat portion 5 to form a flush surface with the tread surfaces 5s. The reflection plate 8 is composed of transparent plastic, and the upper surface thereof is provided with non-slip protrusions 8a which are idetnical both in configuration and in size with the foregoing protrusions 7. This reflection plate 8 may be so disposed as to extend over the entire surface of the flat tread portion 5a. The arrangement may be such that a sheet of large-sized relection plate 8 is provided, or a plurality of small-sized reflection plates 8 are intermittently disposed. Furthermore, conventionally used small and circular reflection plates 9 each having a diameter of b 2 mm or thereabouts may be disposed on both ends of the tread surface 5a. The reflection plate 8 may also be fitted to any one of the top and bottom surfaces of the resinous tread layer 10 on the tread portion 5.

There are at least two ways in which the reflection plate 8 is integrally attached to the tread portion 5 of the tread member;

1. One of the ways is as illustrated in FIGS. 6A, 6B to 8A, 8B.

Figure 6A:
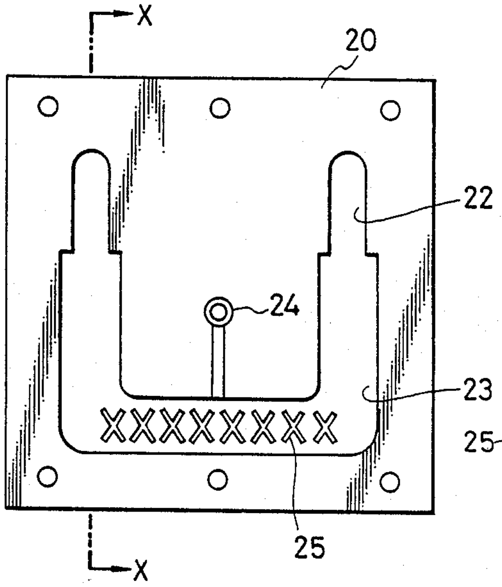
FIGS. 6A-6B, 7A-7B and 8A-8B are explanatory views illustrating a method of manufacturing the climbing step according to the present invention, FIGS. 6A, 7A and 8A being front elevation views of a metal mold for forming the climbing step, and FIGS. 6B, 7B and 8B being taken along the line X—X in FIGS. 6A, 7A, and 8A, respectively.
Figure 6B:
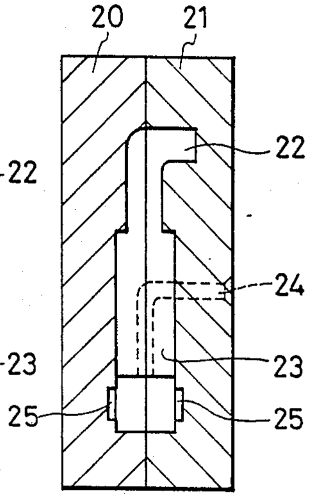
Figure 7A:
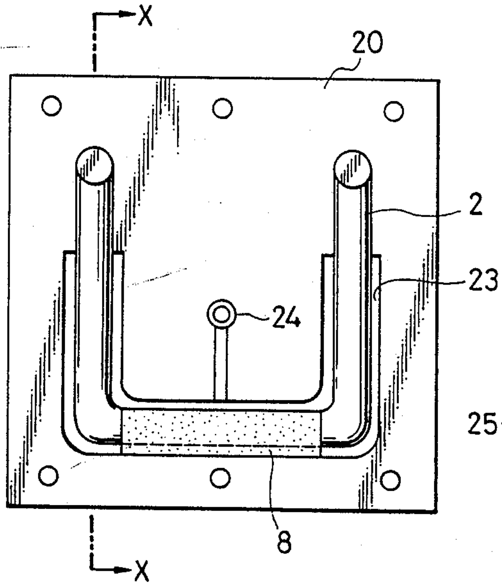
Figure 7B:
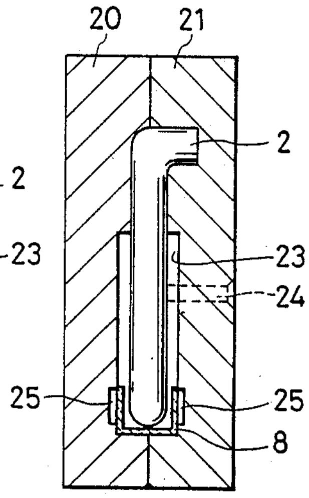
Figure 8A:
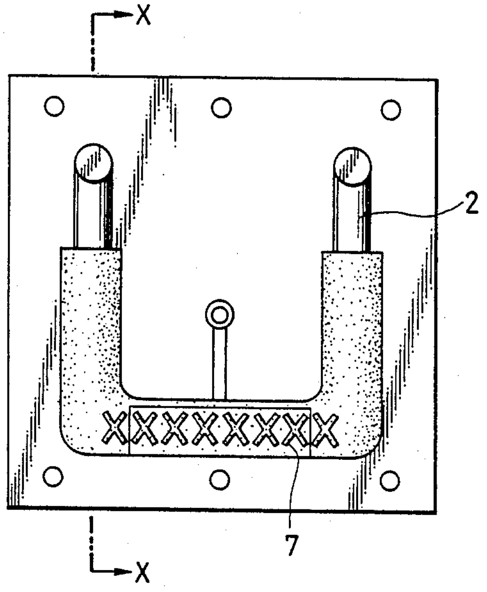
Figure 8B:
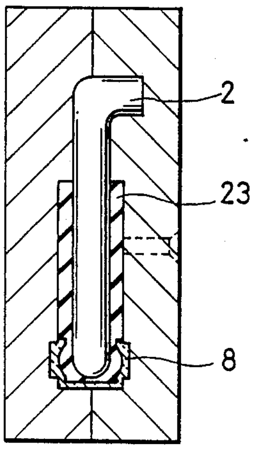

FIGS. 6A, 7A and 8A show respectively front elevational views in which a metal mold half is shown and the other metal mold half is omitted. FIGS. 6B, 7B and 8B show respectively cross sectional view taken along the line X—X of FIGS. 6A, 7A and 8A in which the (set of) metal mold halves are clamped.

In FIGS. 6A and 6B, a set of metal mold halves 20, 21 of an injection molding machine are formed with recessed portions 22 in which the metal core member 2 bent in the substantially Ushape is set and a cavity 23 into which synthetic resin is injected. A gate 24 is provided for injecting synthetic resin. A pattern 25 is also provided for forming non-slip protrusions 7.

As shown in FIG. 7A, the metal mold halves 20, 21 are first opened; then, a reflection plate 8 having U letter shape in cross-section and flat surface and its underside surface assuming the prism-like ruggedness is set in the metal mold halves so as to be located ajdacent the tread portion of the metal core member 2. Then, the metal core member 2 is set in the recessed portion 22. In this state, the metal mold halves are clamped (FIG. 7B)

Melted synethetic resin is injected into the cavity 23 defined by the clamped mold halves, i.e., into the outer periphery of the metal core member 2 and between the metal core member 2 and the reflection plate 8, from the injection gate 24 by normal method. During the injection molding process, the reflection plate 8 is softened, and each non-slip protursion 8a is formed on the flat surface of the reflection plate 8 by pressing the plate against complementary non-slip protrusions in the metal mold halves. Except for the portion on which the protrusions 8a are formed by the pattenrs 25 for the non-slip protrusions, the prism like recessed portions remain as they are and hence the reflection plate maintains its reflective function in the portion exclusive of the protrusions 8a after the molding process has been completed. (FIGS. 8A, 8B)

2. Alternatively, the reflection plate 8 which is provided beforehand with the protrusions 8a is bonded by employing adhesives to the inside of the recessed portion of the tread portion 5 to the tread member 1. The protrusions 8a of the plate 8 are aligned with the protrusions 7 of the tread portion 5, the plate 8 overlying a rectangular portion of the step.

It is easy to recognize the position of the tread portion 5 of the tread member 1 with the help of the reflection plate 8 by making use of the thus constructed tread member 1. This facilitates the motion of putting the foot of the tread portion 5, which leads to easy ascent and descent.

It is therefore possible to readily go up and down even in dark places by seizing the tread portion with a hand or by putting the foot thereon while being guided by the light reflected on the reflection plate 8. As a result, the climber does not fail to set the foot on the tread portion because of mistaking its location whereby he is able to ascend and descend surely and quickly.

Even if the reflection plate 8 increases in size, it is feasible to prevent slippage from the tread portion on account of the non-slip protrusions 7 formed on the surface of the reflection plate 8 for obtaining the security when going up and down.

Figure 4:
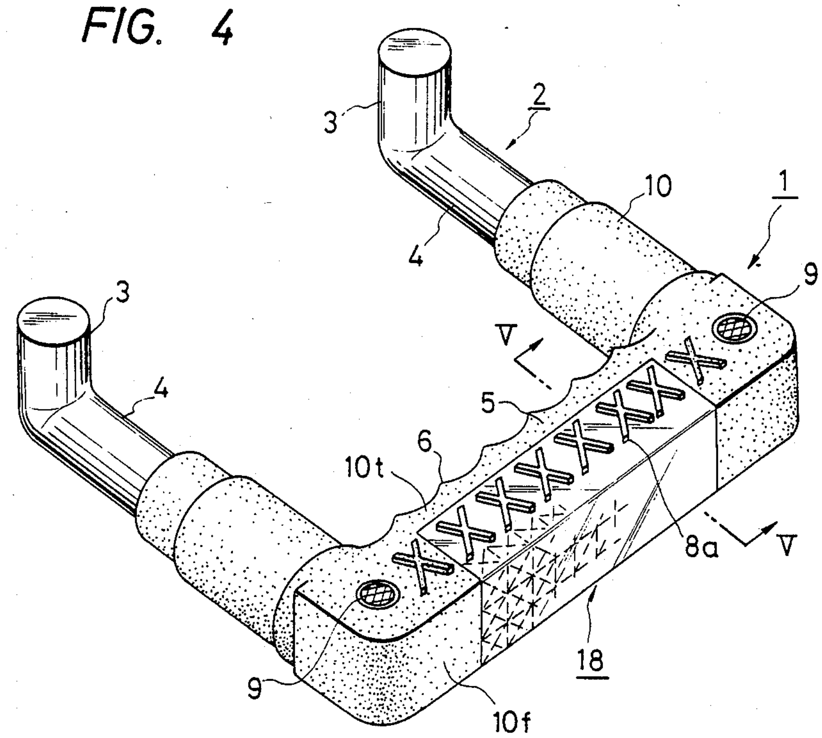
FIG. 4 is a perspective view showing another embodiment of the present invention.
Figure 5:
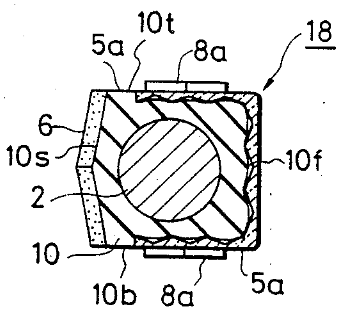
FIG. 5 is an enlarged sectional view taken substantially along the line V—V of FIG. 4.

Referring to FIGS. 4, 5, there is shown another embodiment of the present invention. In this embodiment, the same components as those shown in the first embodiment are marked with the same numerals and the description thereof is herein omitted. A reflection plate 18 is a channel having a substantially U-shape in tranvserve cross section. The reflection plate 18 is attached to the top 10t, bottom 10b and front 10f surfaces of the resinous layer 10 on the tread portion 5 to cover them and provide a coating therearound. The reflection plate 18, as in the case of the first embodiment, includes the prism-like rugged portions formed on the underside of inside surfaces thereof. Non-slip protrusions 8a are respectively provided on the parts corresponding to the top and bottom surfaces of the layer 10 on the tread portion 5. The method of attaching the reflection plate 18 to the tread portion 5 is much the same as that of the first embodiment.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of manufacturing a reflective climbing step comprising a metal core member having a pair of leg members and a tread portion between said pair leg members and a transparent reflective plate embedded in a layer of synthetic resin coating at least the tread portion and portions of the leg members, said method comprising the steps of:

providing the metal core member and the transparent plastic reflective plate having a smooth upper surface and an undersurface formed with prism-like rugged portions;

setting said metal core member and said plastic reflective plate in a cavity in a set of metal molds, said cavity generally corresponding to the shape of said core member, and locating the undersurface of the reflective plate adjacent said tread portion of said metal core member and the upper surface of the reflective plate adjacent protrusion-defining portions of said metal molds;

injecting melted synethetic resin into said cavity of said set of metal molds and between said reflective plate and said tread portion thereby coating said portions of said core member in said mold cavity; and during said injection, pressing said plate against said protrusion-defining portions of said metal molds and softening said plate with heat evolved during injection of said melted synthetic resin, thereby forming non-slip protrusions on the upper surface of said reflective plate.

2. The method of manufacturing the climbing step as set forth in claim 1 wherein said reflective plate is a channel having a U-shaped transverse cross section, an undersurface of said channel being located adjacent said tread portion and melted synthetic resin being injected between said channel and tread portion.

* * * * *